(12) United States Patent
Ren et al.

(10) Patent No.: US 12,399,108 B2
(45) Date of Patent: Aug. 26, 2025

(54) LONG-PATH GAS ABSORPTION CELL OPTICAL SYSTEM

(71) Applicant: HANWEI ELECTRONICS GROUP CORPORATION, Henan (CN)

(72) Inventors: Hongjun Ren, Henan (CN); Haiyong Chen, Henan (CN); Qingyong Yang, Henan (CN); Guofeng Zheng, Henan (CN); Zhigang Li, Henan (CN); Chuanwei Wu, Henan (CN); Dong Li, Henan (CN)

(73) Assignee: HANWEI ELECTRONICS GROUP CORPORATION, Zhengzhou (CN)

( * ) Notice: Subject to any disclaimer, the term of this patent is extended or adjusted under 35 U.S.C. 154(b) by 0 days.

(21) Appl. No.: 18/845,377

(22) PCT Filed: Oct. 25, 2022

(86) PCT No.: PCT/CN2022/127415
§ 371 (c)(1),
(2) Date: Sep. 9, 2024

(87) PCT Pub. No.: WO2023/168951
PCT Pub. Date: Sep. 14, 2023

(65) Prior Publication Data
US 2025/0146925 A1    May 8, 2025

(30) Foreign Application Priority Data

Mar. 7, 2022  (CN) .......................... 202210216123.3
Jul. 29, 2022  (CN) .......................... 202221981020.8

(51) Int. Cl.
*G01N 21/03*    (2006.01)
*G01N 21/31*    (2006.01)
(Continued)

(52) U.S. Cl.
CPC ........... *G01N 21/031* (2013.01); *G01N 21/31* (2013.01); *G02B 5/10* (2013.01); *G02B 17/0615* (2013.01); *G02B 17/06* (2013.01)

(58) Field of Classification Search
CPC ........ G01N 21/031; G01N 21/31; G02B 5/10; G02B 17/0615; G02B 17/06
(Continued)

(56) References Cited

U.S. PATENT DOCUMENTS 5,726,752 A * 3/1998 Uno ...................... G01N 21/031
356/244
7,876,443 B2 * 1/2011 Bernacki .............. G02B 17/004
356/432

(Continued)

FOREIGN PATENT DOCUMENTS

CN    102593698 A    7/2012
CN    203534951 U    4/2014
(Continued)

OTHER PUBLICATIONS

International Search Report of PCT Patent Application No. PCT/CN2022/127415 issued on Jan. 18, 2023.
(Continued)

*Primary Examiner* — Michelle M Iacoletti
*Assistant Examiner* — Noah J. Haney

(57) ABSTRACT

A long-path gas absorption cell reflective optical system, which includes a first reflector (1) and a second reflector (2), the first reflector (1) and the second reflector (2) are set opposite and spaced apart, with the second reflector (2) having an optical input port (3) and an optical output port (4). The first reflector (1), the second reflector (2), the optical input port (3), and the optical output port (4) together constitute a multiple reflection optical system; a collimated light beam enters through the optical input port (3) and
(Continued)

reflects between the first reflector (1) and the second reflector (2), finally exiting through the optical output port (4). This achieves a longer light path for the collimated light beam within a limited space, allowing for more reflections; the system has a simple structure, relatively simple optical adjustment, is easy to operate, and has stable performance, making it widely applicable in various detection environments.

14 Claims, 8 Drawing Sheets

(51) Int. Cl.
*G02B 5/10* (2006.01)
*G02B 17/06* (2006.01)

(58) Field of Classification Search
USPC .......................................................... 356/437
See application file for complete search history.

(56) References Cited

U.S. PATENT DOCUMENTS

| | | | | |
|---|---|---|---|---|
| 10,365,204 | B2 * | 7/2019 | Rubin | ...................... G02B 5/10 |
| 2006/0158644 | A1 * | 7/2006 | Silver | ................... G01N 21/031 |
| | | | | 356/246 |
| 2009/0190137 | A1 * | 7/2009 | Stenton | ................. G01M 11/005 |
| | | | | 359/858 |
| 2014/0160474 | A1 * | 6/2014 | Keller | ................. G01N 21/0303 |
| | | | | 356/246 |
| 2017/0322149 | A1 * | 11/2017 | Pape | ................... G01N 21/1702 |
| 2021/0247296 | A1 * | 8/2021 | Igarashi | .................... B01J 19/12 |

FOREIGN PATENT DOCUMENTS

| | | | | | |
|---|---|---|---|---|---|
| CN | 205620291 | U | | 10/2016 | |
| CN | 109073544 | A | | 12/2018 | |
| CN | 109407310 | A | | 3/2019 | |
| CN | 109270006 | B | * | 10/2020 | ............. G01N 21/01 |
| CN | 111896475 | A | | 11/2020 | |
| DE | 102016102430 | B3 | | 8/2017 | |
| JP | 2009080017 | A | | 4/2009 | |
| TW | 200918951 | A | | 5/2009 | |
| WO | WO-2014049358 | A1 | * | 4/2014 | ........... G01N 21/031 |

OTHER PUBLICATIONS

International Preliminary Report On Patentability of PCT Patent Application No. PCT/CN2022/127415 issued on Jan. 22, 2024.

* cited by examiner

LONG-PATH GAS ABSORPTION CELL OPTICAL SYSTEM

CROSS-REFERENCE TO RELATED APPLICATIONS

This patent application claims the benefit of PCT/CN2022/127415 filed Oct. 10, 2022. The above application are incorporated by reference herein.

TECHNICAL FIELD

This disclosure relates to the technical field of optical gas sensor detection, particularly to a long-path gas absorption cell reflective optical system.

BACKGROUND TECHNOLOGY

Industrial gas sensors are essential for ensuring gas safety. With the rapid development of China's economy and the deepening optimization of the Internet of Things in industrial applications, industrial sensors have gradually evolved towards low power consumption, miniaturization, and portability in recent years. Existing optical gas sensors, known for their long lifetime, high precision and resistance to poisoning, are widely used in the field of gas detection; the optical gas absorption cell is the core component of the sensor, directly determining the sensor's performance and dimensions.

With the rapid advancement of infrared and laser technologies, spectroscopic detection based on gas absorption has become an effective means for trace gas detection in environmental and industrial processes. According to the Beer-Lambert law, the sensitivity of measurement depends on the optical path length and the gas absorption coefficient; an increase in the optical path length also enhances sensitivity. Currently, there is an increasing demand for higher sensitivity in trace gas detection with concentration of gas at ppm or even ppb level, which requires a longer optical path to realize.

At present, the typical optical systems used in the market are the White cell and the Herriott cell. The Herriott cell optical system consists of two reflectors with the same radius of curvature placed coaxially opposite each other and separated by a specific distance from each other. The incident light beam will form a ring of light spots on each of the two reflectors, so the Herriott cell has fewer reflections.

As the demand for precision in the field of gas detection increases, the optical path length of the optical gas absorption cell also requires further extension. To achieve a longer optical path within a limited space, more reflections are required in the absorption cell. However, traditional optical gas absorption cells have limitations in achieving multiple reflections within a narrow space and have a short optical path, which restricts the detection environment and concentration range, failing to meet customer's needs.

DISCLOSURE CONTENT

In view of the limited number of reflections and the low optical path length to volume ratio of existing optical gas absorption cells in a narrow space, this disclosure proposes a long-path gas cell reflective optical system that enables a collimated light beam to achieve a longer optical path within a limited space, completing more reflections.

To achieve the above objectives, the technical solution of this disclosure is implemented as follows: A long-path gas absorption cell reflective optical system, which includes a first reflector and a second reflector, with the first reflector and the second reflector set opposite and spaced apart. The second reflector is equipped with a light input port and a light output port. The first reflector, the second reflector, the light input port, and the light output port together constitute a reflective optical system; A collimated light beam enters from the light input port, reflects between the first reflector and the second reflector multiple times, and exits through the light output port.

Preferably, the second reflector includes a concave surface and an outer annular surface, with the concave surface set within the outer annular surface; the light input port and the light output port are both located on the outer annular surface of the second reflector.

Preferably, the radius of curvature R3 of the concave surface of the second reflector is equal to the radius of curvature R1 of the first reflector, and the outer annular surface of the second reflector is flat.

Preferably, the central angle $\gamma$ corresponding to the space between the light input port and the light output port is related to the radius of curvature R1 of the first reflector, the radius of curvature R3 of the concave surface of the second reflector, or the distance d between the first reflector and the second reflector.

Preferably, the incident collimated light beam forms an axial angle $\alpha$ with the axis of the second reflector, and the radial angle $\beta$ of the collimated light beam projected on the second reflector, with both the axial angle $\alpha$ and the radial angle $\beta$ being related to the radius of curvature R1 of the first reflector, the radius of curvature R3 of the concave surface of the second reflector, or the spacing distance d between the first reflector and the second reflector.

Preferably, the number of reflected light spots formed on the first reflector is equal to the number of reflected light spots formed on the second reflector.

Preferably, the radius of curvature R3 of the concave surface of the second reflector is equal to the radius of curvature R1 of the first reflector, and the outer annular surface of the second reflector is flat.

Preferably, the optical path of the collimated light beam reflecting between the first reflector and the second reflector is as follows: the collimated light beam enters through the light input port and first reaches the first reflector, reflects off the first reflector to the concave surface of the second reflector, then reflects off the second reflector back to the first reflector, and finally from the first reflector reflects to the outer annular surface of the second reflector; following this pattern of reflection repeats, ultimately forming a ring of reflected light spots on the first reflector, and forming a ring of reflected light spots on both the concave surface and the outer annular surface of the second reflector.

Preferably, the radius of curvature R3 of the concave surface of the second reflector is equal to the radius of curvature R1 of the first reflector, and the radius of curvature R2 of the outer annular surface of the second reflector is approximately 2.1*R1 to 2.2*R1. The input port and the output port are both arranged on the outer torus of the radius of curvature R2 of the second reflector.

The optical path of the collimated light beam reflecting between the first reflector and the second reflector is as follows: the collimated light beam enters through the light input port and first reaches the first reflector, reflects off the first reflector to the second reflector, then reflects off the second reflector back to the first reflector; following this pattern of reflection repeats, ultimately forming two rings of reflected light spots on the first reflector, two rings of light spots on the concave surface, and one ring of reflected light spots on the outer annular surface of the second reflector for a total of three rings of light spots.

Preferably, the collimated light beam enters through the light input port and first reaches the first reflector at the reflected light spot ring I, reflects off the first reflector to the third ring of reflected light spots on the second reflector, then reflects off the second reflector back to the reflected light spot ring I on the first reflector, after reflecting off the first reflector it returns to the first ring of reflected light spots on the second reflector, after reflecting off the second reflector it reaches the reflected light spot ring II on the first reflector, then after reflecting off the first reflector it returns to the second ring of reflected light spots on the second reflector, and after reflecting off the second reflector it returns to the reflected light spot ring I on the first reflector.

Preferably, the reflected light spot ring I is located between the annular diameter D2 and the outer diameter D1 on the reflective surface of the first reflector, and the reflected light spot ring II is located within the annular diameter D2;

The first ring of reflected light spots is located within the annular region between the outer diameter D3 and diameter D4 of the outer annular surface, the second ring of reflected light spots is located within the annular region between diameter D4 and the annular diameter D5 on the concave reflective surface, and the third ring of reflected light spots is within the range of the annular diameter D5; the input end and the output end are both set at the center of the light spots of the first ring of reflected light spots.

Compared with existing techniques, the beneficial effects of this disclosure include:
1. In this disclosure, the reflector structure is easy to manufacture. By designing the radius of curvature of the first reflector to be equal to the radius of curvature of the concave surface of the second reflector, the manufacturing process of the reflectors is simplified to a degree, ensuring precision in manufacturing, and also ensuring that the distribution of light spots formed on the second reflector by the collimated light beam is uniform.
2. The second reflector is designed to include a concave surface and an outer annular surface, with both the light input port and the light output port located on the outer annular surface of the second reflector. When the radius of curvature of the outer annular surface of the second reflector is infinite, the collimated light beam reflects multiple times between the two reflectors, and ultimately forms a ring of reflected light spots on the first reflector, and forms a ring of reflected light spots on both the concave surface and the outer annular surface of the second reflector, with the light spots on the second reflector being evenly distributed;
When the radius of curvature of the outer annular surface of the second reflector is approximately 2.1 to 2.2 times the radius of curvature of the first reflector, the number of reflections in the same spatial dimensions can reach three times or more than that of the Herriott cell; with a fixed optical path length, the overall dimensions of the optical system can be made smaller.
3. By adjusting the radius of curvature of the two reflectors and the spacing distance between them, the number of reflections of the collimated light beam within the absorption cell and the size of the reflected light spot rings formed can be changed, thus obtaining long-path gas absorption cells of various sizes as per different requirements.
4. The mirror pieces of the first and second reflectors in this disclosure are easy to manufacture and ensure precision, and the system structure is simple, optical adjustment is relatively straightforward, easy to operate, and the performance is stable, making it widely applicable in various detection environments.

BRIEF DESCRIPTION OF DRAWINGS

To more clearly illustrate the technical solutions in the embodiments of this present disclosure or in the prior art, the following will provide a simple introduction to the drawings used in the description of the embodiments or prior art. Obviously, the drawings described below are just some embodiments of this present disclosure; for those of ordinary skill in this field, other drawings can be obtained based on these drawings without creative efforts.

In the figures: 1—the first reflector, 2—the second reflector, 3—the input end, 4—the output end.

DETAILED DESCRIPTION OF EMBODIMENTS

The following will combine the drawings in the embodiments of this present disclosure to clearly and completely describe the technical solutions in the embodiments of this present disclosure. Obviously, the described embodiments are merely part of the embodiments of this present disclosure, not all of them. Based on the embodiments in this present disclosure, all other embodiments obtained by those of ordinary skill in this field without creative efforts fall within the protection scope of this present disclosure.

Embodiment 1

Figure 1:
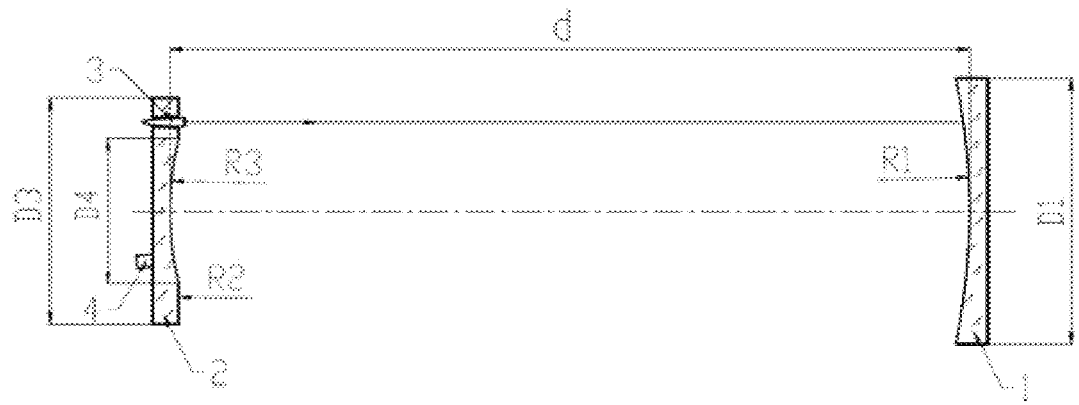
FIG. 1 is a schematic structural view of Embodiment 1 of this present disclosure.

As shown in FIG. 1, this present disclosure provides a long-path gas absorption cell reflective optical system, which includes a first reflector 1 and a second reflector 2, with the first reflector 1 and the second reflector 2 set opposite and spaced apart, and the first reflector 1 and the second reflector 2 are coaxially arranged to ensure that light reflects back and forth between the first reflector 1 and the second reflector 2. The said first reflector 1 is a concave mirror, and the second reflector 2 is respectively equipped with a light input port 3 and a light output port 4, with the first reflector 1, the second reflector 2, the light input port 3, and the light output port 4 together constituting a reflective optical reflection system. The collimated light beam emitted by the light source enters the absorption cell through the light input port 3, reflects more than once between the first reflector 1 and the second reflector 2, and finally exits through the light output port 4, achieving a longer optical path length within a limited space.

In this embodiment, the said second reflector 2 includes a concave surface and an outer annular surface, with the light input port 3 and the light output port 4 both set on the outer annular surface of the second reflector 2. Suppose the radius of curvature of the first reflector 1 is R1, the outer diameter is D1, the outer diameter of the second reflector 2 is D3, the radius of curvature of the outer annular surface of the second reflector 2 is R2, the radius of curvature of the concave surface of the second reflector 2 is R3, and the outer diameter corresponding to the concave surface of the second reflector 2 is D4, where the outer annular surface of the second reflector is flat, its radius of curvature R2 is infinite, and the radius of curvature R3 of the concave surface of the second reflector is equal to the radius of curvature R1 of the first reflector 1. The advantage of this design is that it is easier to manufacture the first and second reflectors, simplifies the manufacturing process of the reflectors, ensures precision in manufacturing; and also ensures that the distribution of light spots formed on both reflectors by the collimated light beam is uniform.

Figure 2:
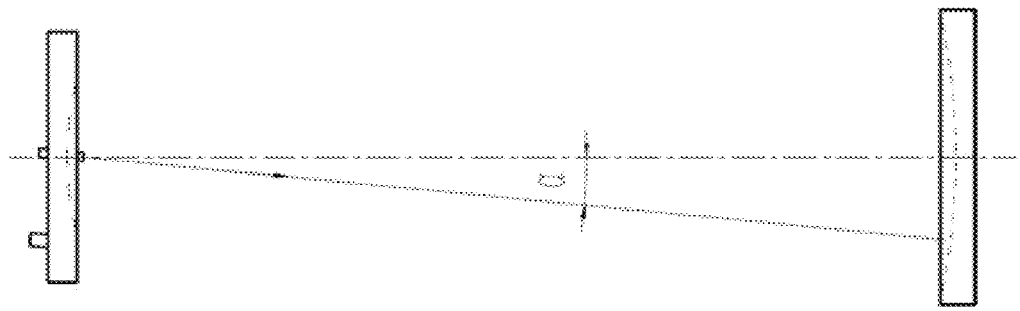
FIG. 2 is a schematic view showing the axial angle formed when the collimated light beam enters according to this present disclosure.
Figure 3:
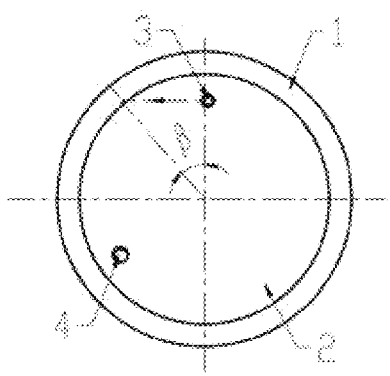
FIG. 3 is a schematic view showing the radial angle formed when the collimated light beam enters according to this present disclosure.

Furthermore, as shown in FIGS. 2 and 3, the collimated light beam that enters forms an axial angle α with the axis of the second reflector 2, and the radial angle β of the collimated light beam projected on the second reflector 2, and both the axial angle α and the radial angle β are related to the radius of curvature R1 of the first reflector 1, the radius of curvature R3 of the concave surface of the second reflector, or the spacing distance d between the first reflector 1 and the second reflector 2. That is, by adjusting the radius of curvature R1 of the first reflector 1 or the radius of curvature R3 of the concave surface of the second reflector or the spacing distance d between the first reflector 1 and the second reflector 2, the reflection angle of the collimated light beam can be changed, thereby changing the number of reflections of the collimated light beam within the absorption cell and the size of the light rings of the reflected light spots formed.

Figure 4:
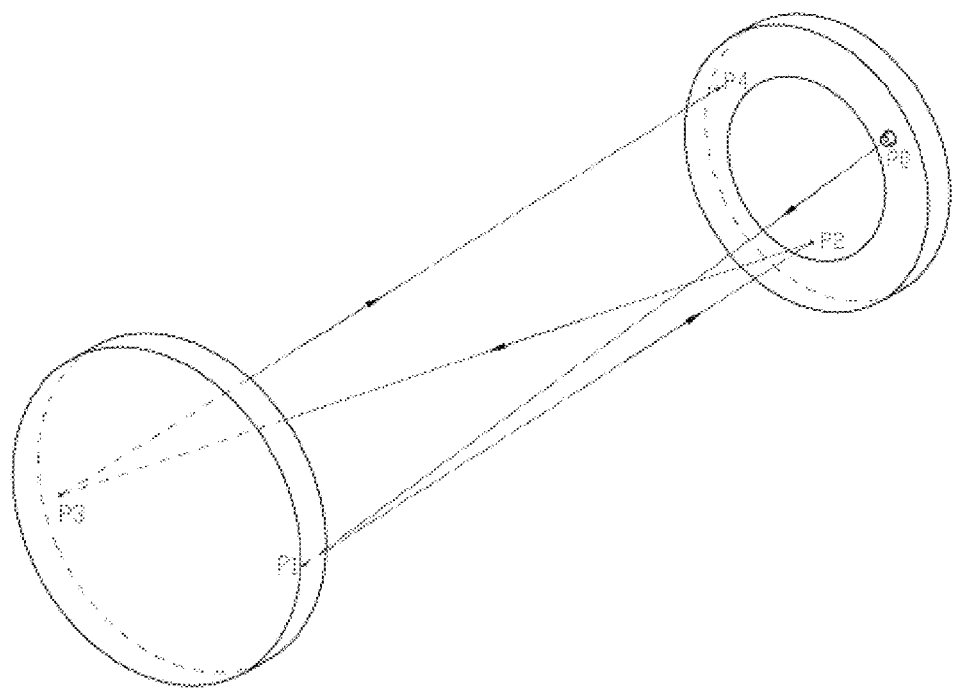
FIG. 4 is a schematic view of the light path of the first reflection of the collimated light beam in Embodiment 1 of this present disclosure.
Figure 5:
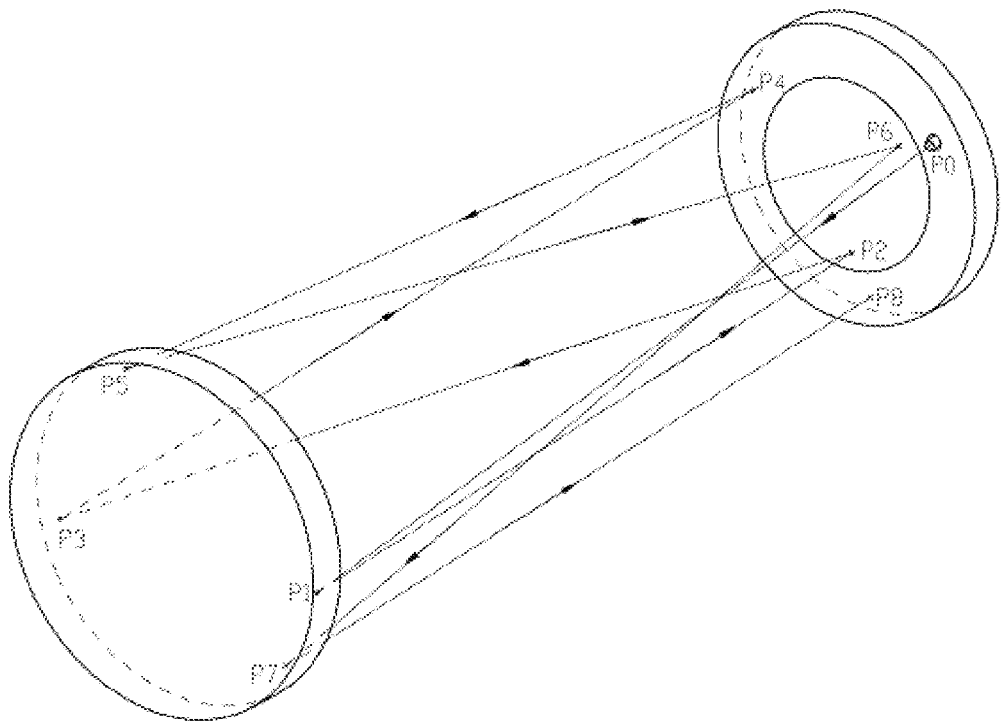
FIG. 5 is a schematic view of the light path of the second reflection of the collimated light beam in Embodiment 1 of this present disclosure.
Figure 6:
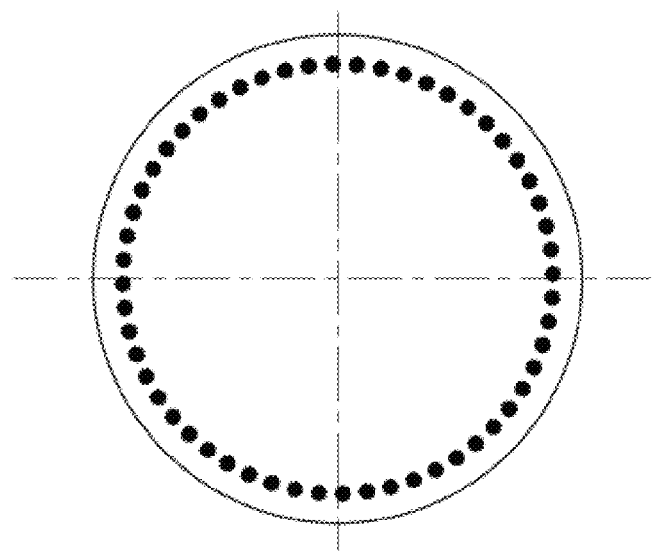
FIG. 6 is a distribution map of the reflected light spots formed on the first reflector in Embodiment 1 of this present disclosure.

As shown in FIGS. 4 and 5, the light path of the collimated light beam reflecting between the first reflector 1 and the second reflector 2 is as follows: the collimated light beam enters through the light input port 3 and first reaches the surface P1 of the first reflector 1, then reflects according to the law of reflection to the surface P2 of the concave surface of the second reflector 2, reflects off the second reflector 2 to the surface P3 of the first reflector 1, and then reflects back from the first reflector 1 to the surface P4 of the outer annular surface of the second reflector 2, forming the first group of reflected light beams. The collimated light beam then reflects off the second reflector 2 at P4 to the surface P5 of the first reflector 1, and subsequently follows the reflection rules of the first group, sequentially reflecting through reflection points P6, P7 to the surface P8 of the second reflector 2, forming the second group of reflected light beams. The collimated light beam reflects multiple times between the first reflector 1 and the second reflector 2, ultimately forming a ring of reflected light spots on the first reflector 1, and forming a ring of reflected light spots on both the concave surface and the outer annular surface of the second reflector 2. Moreover, the number of reflected light spots formed on the first reflector 1 is equal to the total number of reflected light spots formed on the two rings of the second reflector 2, as specifically shown in FIGS. 6 and 7. By adjusting the spacing distance d between the first reflector 1 and the second reflector 2 and the incident angles α and β of the collimated light beam, the position of the outer ring light spots on the second reflector 2 can be changed, allowing the light beam to ultimately reach the light output port 4 and exit. The optical simulation diagram of this disclosure is shown in FIG. 8.

Since the light source device at the light input port and the detector device at the light output port both have specific size requirements, there are also size requirements for the spacing between adjacent reflected light spots in the absorption cell. In this embodiment, the light input port 3 and the light output port 4 are set on different reflected light spots on the outer annular surface of the second reflector 2, and there are no requirements for the spacing of the reflected light spots on the first reflector or the inner ring reflected light spots on the second reflector. In this way, with a fixed optical path, the overall dimensions of the optical system can be made smaller.

Figure 7:
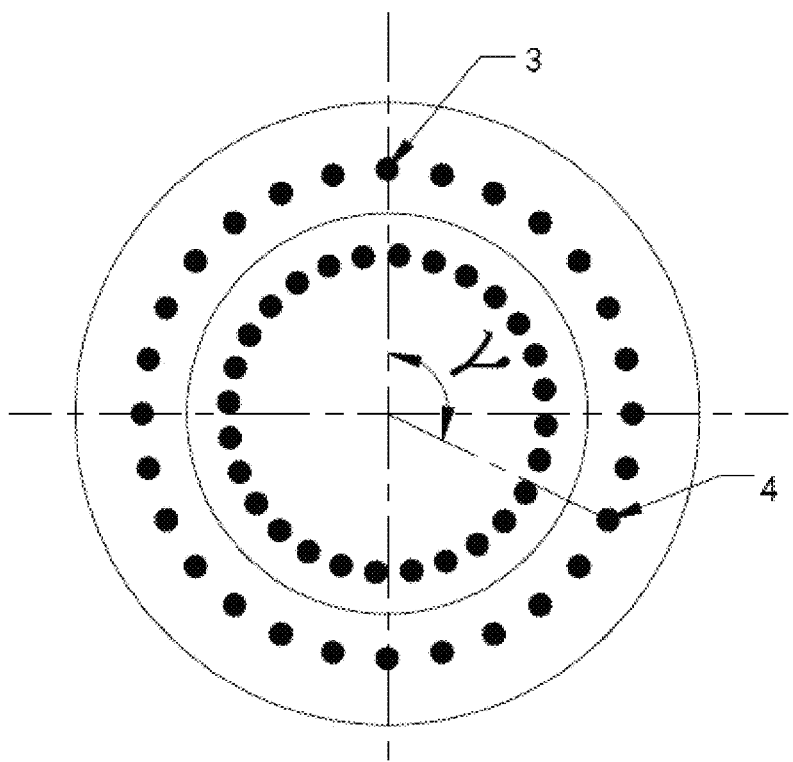
FIG. 7 is a distribution map of the reflected light spots formed on the second reflector in Embodiment 1 of this present disclosure.
Figure 8:
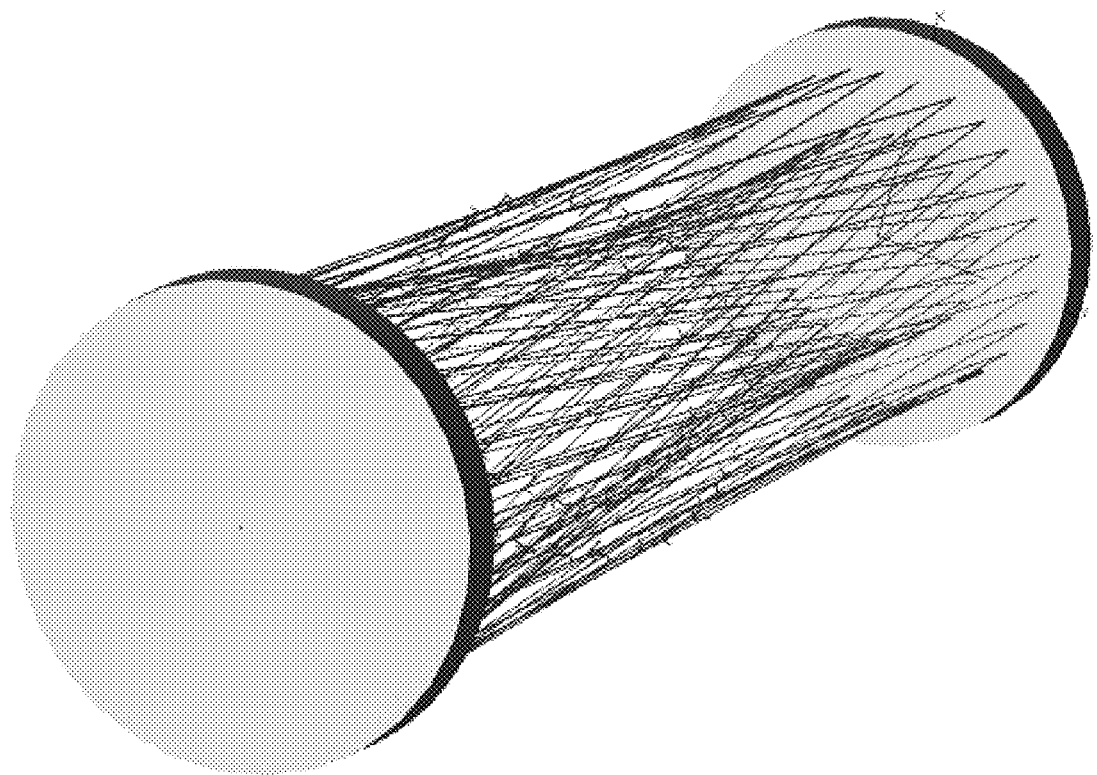
FIG. 8 is an optical simulation diagram of Embodiment 1 of this present disclosure.

As shown in FIG. 7, the central angle γ corresponding to the space between the light input port 3 and the light output port 4 is related to the radius of curvature R1 of the first reflector 1, the radius of curvature R3 of the concave surface of the second reflector 2, or the spacing distance d between the first reflector 1 and the second reflector 2. That is, by adjusting the parameters R1, R3, d, or the incident angles α, β, the number of reflections of the collimated light beam within the absorption cell and the size of the light rings of the reflected light spots formed can be changed, thus obtaining long-path gas absorption cells of various sizes as per different requirements. The system structure of this disclosure is simple, optical adjustment is relatively straightforward, easy to operate, and the performance is stable, making it widely applicable in various detection environments.

Embodiment 2

Figure 9:
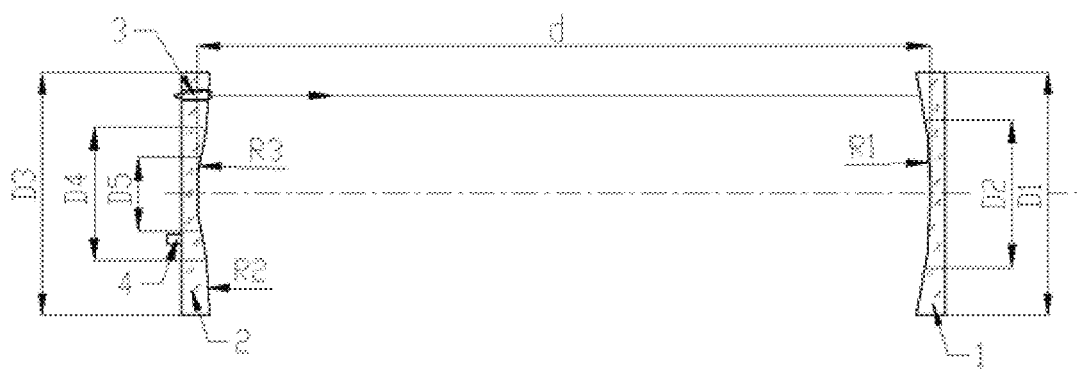
FIG. 9 is a schematic structural view of Embodiment 2 of this present disclosure.

As shown in FIG. 9, a long-path gas absorption cell reflective optical system includes a first reflector 1 and a second reflector 2, with the first reflector 1 and the second reflector 2 set opposite and coaxially to ensure that light reflects back and forth between the first reflector 1 and the second reflector 2. The first reflector 1 is a concave mirror. The second reflector 2 is equipped with an input end 3 and an output end 4 and is a composite concave mirror, including an outer annular surface and a concave surface, with the concave surface set within the outer annular surface, and both the first reflector 1 and the second reflector 2 reflect light. The input end 3 and the output end 4 are both set between the diameter D4 where the outer annular surface and the concave surface meet and the outer diameter D3 of the outer annular surface, with the radius of curvature R3 of the concave surface being equal to the radius of curvature R1 of the first reflector 1, and the radius of curvature R2 of the outer annular surface being approximately 2.1 to 2.2 times the radius of curvature R1 of the first reflector 1.

The radius of curvature of the first reflector 1 is R1, its outer diameter is D1, and the annular diameter on the reflective surface is D2. The radius of curvature of the second reflector 2 in the annular region between diameter D4 and outer diameter D3 is R2, the annular diameter on the concave reflective surface is D5, and within the range of the annular diameter D5, the radius of curvature is R3. Further, as shown in FIGS. 2 and 3, the collimated light beam that enters forms an axial angle α with the axis of the second reflector 2, and the radial angle β of the collimated light beam projected on the second reflector 2, with both the axial angle α and the radial angle β being related to the radius of curvature R1 of the first reflector 1, the radius of curvature R3, R2 of the second reflector, and the spacing distance d between the first reflector 1 and the second reflector 2. That is, by adjusting the radius of curvature R1 of the first reflector 1 or the radius of curvature R3, R2 of the second reflector or the spacing distance d between the first reflector 1 and the second reflector 2, the reflection angle of the collimated light beam on the surfaces of the first and second reflectors can be adjusted, thereby changing the number of reflections of the collimated light beam within the absorption cell and the size of the light rings of the reflected light spots formed.

Figure 10:
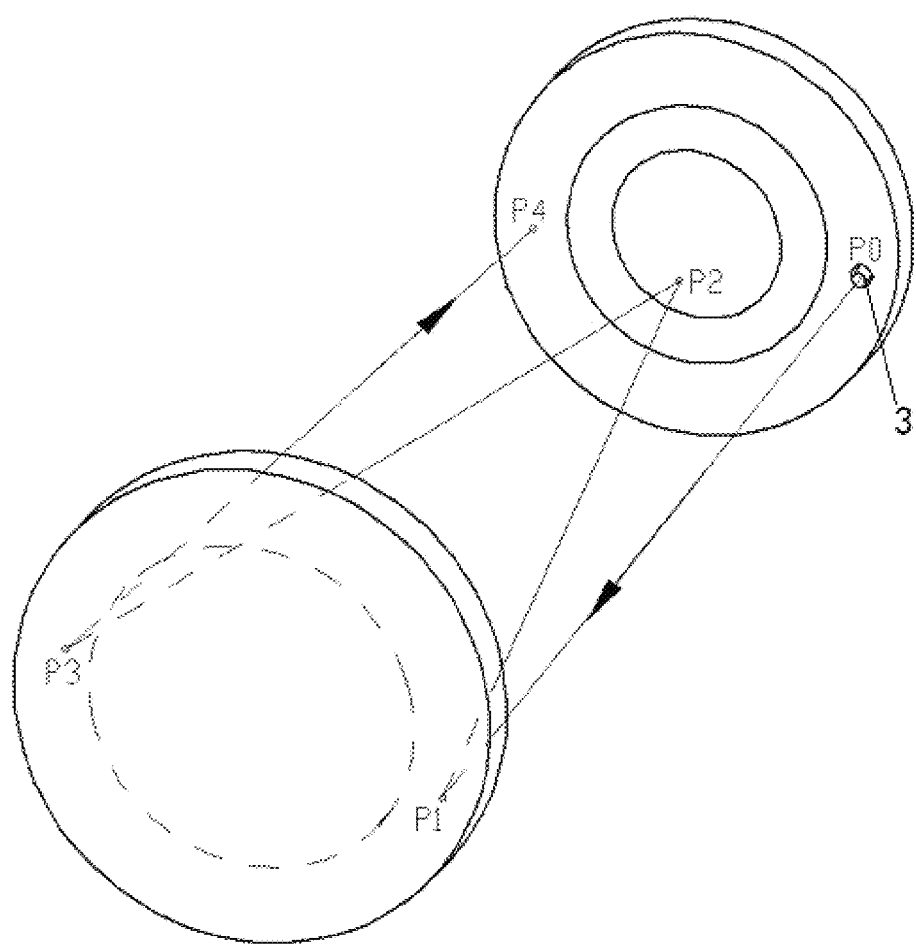
FIG. 10 is a schematic view of the reflection of the first group of reflected light beams in Embodiment 2 of this present disclosure.

As shown in FIG. 10, the input end 3 emits a collimated light beam at P0 at a specific angle to reach the surface P1 of the first reflector 1, with Pt located between the outer diameter D1 and the annular diameter D2 of the first reflector 1. After reflecting off the first reflector 1 according to the law of reflection, it reaches the surface P2 of the second reflector 2, with P2 located within the range of the annular diameter D5 of the second reflector 2. After reflecting off the second reflector 2, it reaches the surface P3 of the first reflector 1, with P3 located between the outer diameter D1 and the annular diameter D2 of the first reflector 1, and then reflects back to the surface P4 of the second reflector 2, with the light beam between P0-P4 forming the first group of reflected light beams, and P4 located between the outer diameter D3 and diameter D4 of the second reflector 2.

Figure 11:
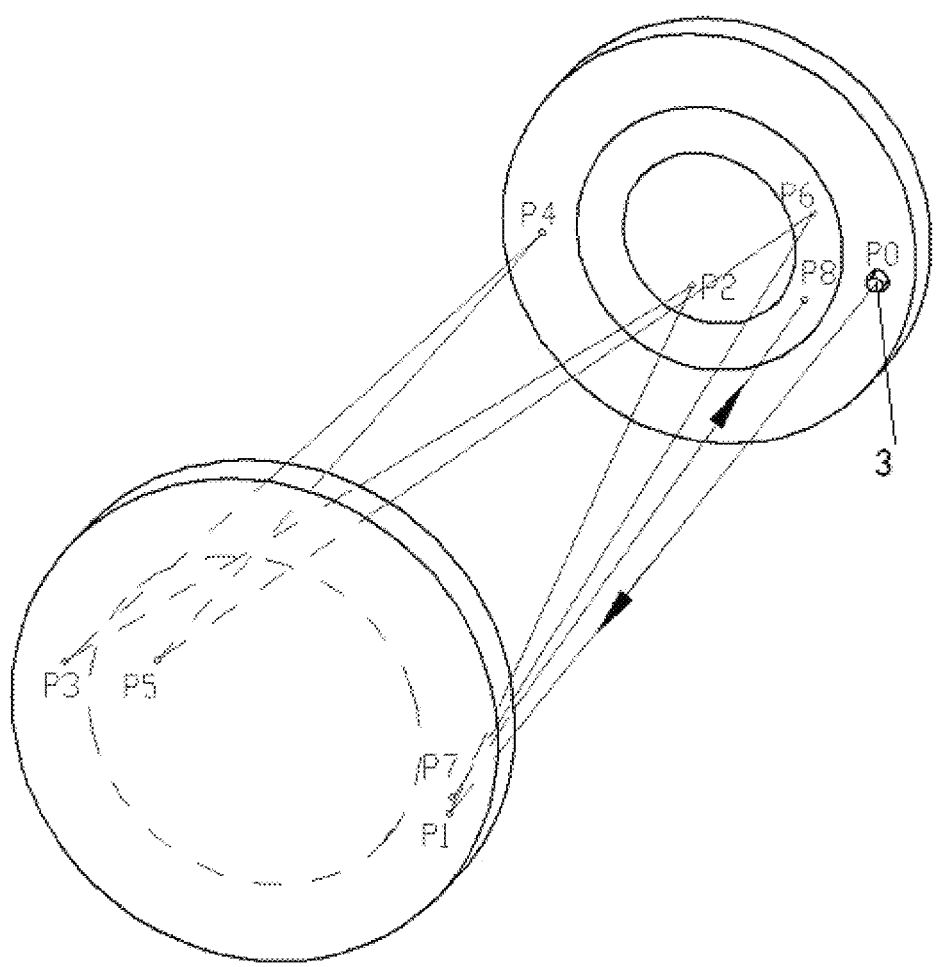
FIG. 11 is a schematic view of the reflection of the second group of reflected light beams in Embodiment 2 of this present disclosure.

As shown in FIG. 11, when the light beam reflects off the second reflector 2 at P4 and reaches the surface P5 of the first reflector 1, with P5 located within the annular diameter D2 region of the first reflector 1 surface, it continues with the same rules as the first group and sequentially reflects through the surface P6 of the second reflector 2, the surface P7 of the first reflector 1 to the surface P8 of the second reflector 2, with the light beam between P4-P8 forming the second group of reflected light beams, P6 located between the diameter D4 and the annular diameter D5 of the second reflector 2, P7 located between the outer diameter D1 and the annular diameter D2 of the first reflector 1, and P8 located between the diameter D4 and the annular diameter D5 of the second reflector 2. The light beam from P0-P8 is set according to the law of reflection.

Figure 12:
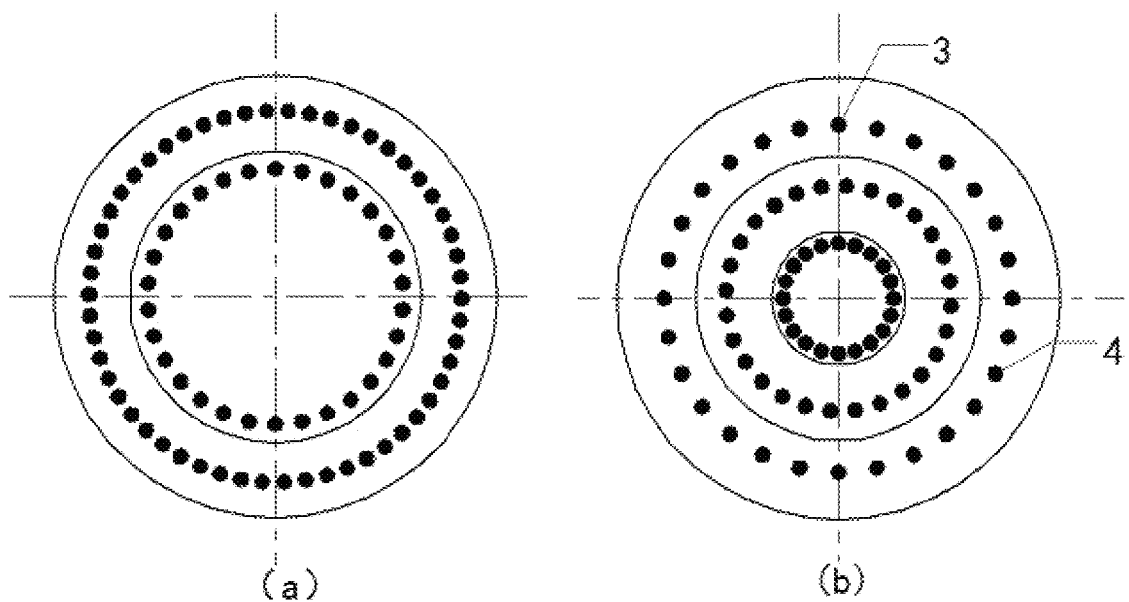
FIG. 12 is a distribution map of the light spots obtained in Embodiment 2 of this present disclosure, where (a) is the first reflector, and (b) is the second reflector.

As shown in FIG. 12, similarly to the first and second groups of reflected light beams, the light beam continues to reflect back and forth between the first reflector 1 and the second reflector 2, ultimately forming two rings of reflected light spots on the first reflector 1. At the same time, within the annular region between the outer diameter D3 and diameter D4 on the second reflector 2, one ring of reflected light spots is formed; within the annular region between diameter D4 and the annular diameter D5 on the second reflector 2, a second ring of reflected light spots is formed; and within the range of the annular diameter D5 on the second reflector 2, a third ring of reflected light spots is formed. The number of reflected light spots in the two rings on the surface of the first reflector 1 is equal to the total number of reflected light spots in the three rings on the surface of the second reflector 2. By adjusting the distance d between the first reflector 1 and the second reflector 2, the position of the outer ring light spots on the second reflector 2 can be changed, allowing the light beam to ultimately reach the output end position and exit.

Since the light source device at the input end and the detector device at the output end both have specific size requirements, the spacing between the input end, the output end, and adjacent light spots in the absorption cell also have size requirements. Typically, the outer diameter of a detector is not less than 5 mm, and the size of a light source is generally not less than 3 mm. The input end and the output end of this utility model are both set at the outer ring light spots of the second reflector 2. Since the light source device and the detector device are not set at this location, there are no requirements for the spacing of the light spots on the first reflector or the inner ring light spots on the second reflector 2. Thus, with a fixed optical path, the overall dimensions of the optical system can be made smaller.

By adjusting the values of parameters R1, R2, R3, d, and the incident angle α, different numbers of reflections and diameters of light spot rings can be achieved, thereby obtaining long-path gas absorption cells of various sizes as per different requirements. The mirror pieces of the optical system of this utility model are easy to manufacture and ensure precision. The resulting gas absorption cells not only have relatively simple optical adjustments and are easy to operate, but also have stable performance and can be widely used in various detection environments. This application increases the number of reflections in the optical system, serving as the core component of the detection product—the gas absorption cell—further enhancing optical path length to volume ratio, resulting in a longer optical path in the same structural space.

Figure 13:
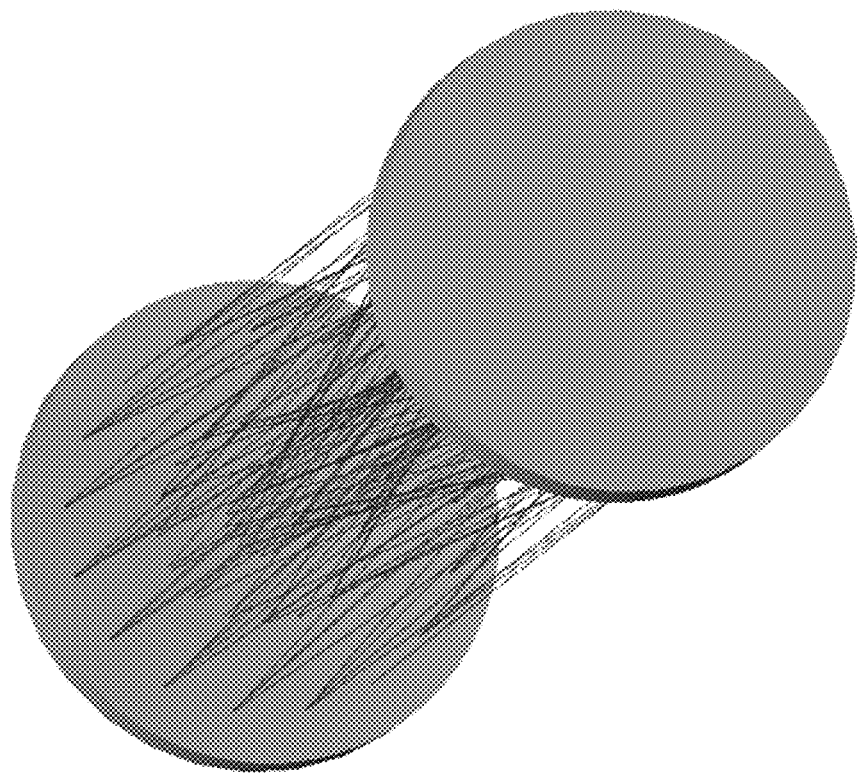
FIG. 13 is an optical simulation diagram one of Embodiment 2 of this present disclosure.
Figure 14:
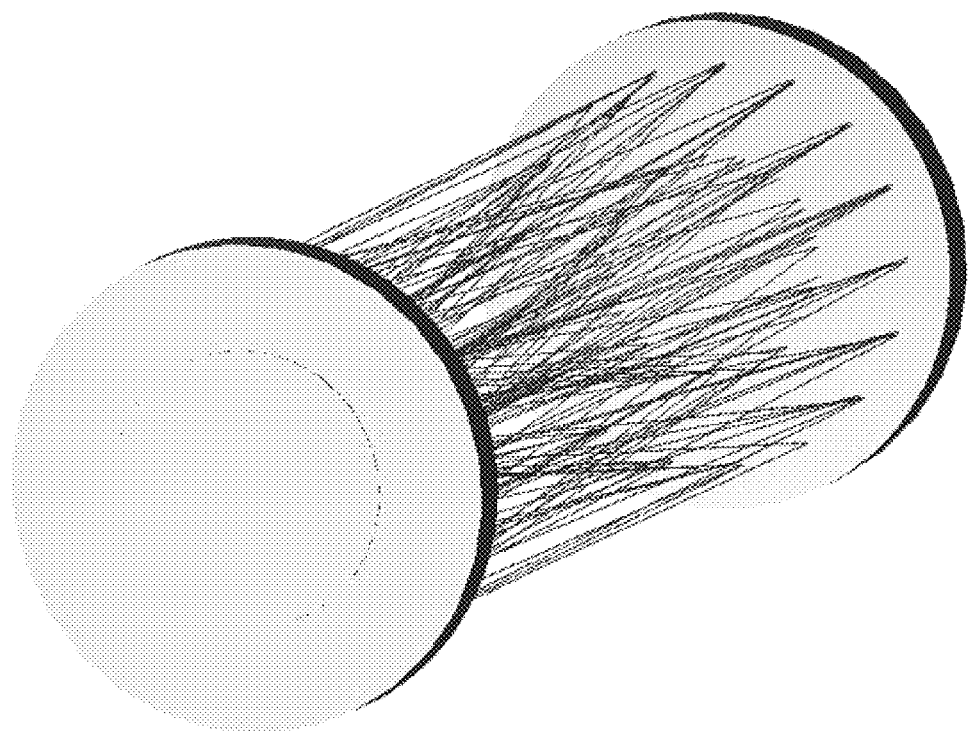
FIG. 14 is an optical simulation diagram two of Embodiment 2 of this present disclosure.
Figure 15:
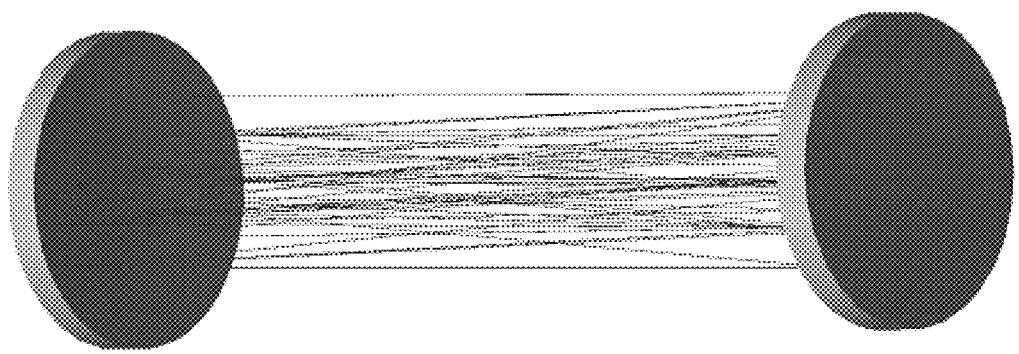
FIG. 15 is an optical simulation diagram three of Embodiment 2 of this present disclosure.

Simulations conducted with optical software yield the optical simulation diagrams shown in FIGS. 13 and 14. Based on the optical systems shown in optical simulation diagram one and optical simulation diagram two, the gas chamber structure of the optical cavity can be designed to be cylindrical. The results of optical simulation diagram one, by reducing the number of reflections and changing the position of the output end, yield the optical simulation diagram shown in FIG. 15. Based on the optical system shown in optical simulation diagram three, the gas chamber structure of the optical cavity can be designed to be flat.

The above descriptions are merely preferred embodiments of this disclosure and are not intended to limit the scope of this disclosure. Any modifications, equivalent substitutions, improvements, etc., made within the spirit and principles of this disclosure, are intended to be included within the scope of protection of this disclosure.

The invention claimed is:

1. A long-path gas absorption cell optical system, characterized in that it comprises a first reflector (1) and a second reflector (2), wherein the first reflector (1) and the second reflector (2) are set opposite and spaced apart; the second reflector (2) is equipped with a light input port (3) and a light output port (4), and the first reflector (1), the second reflector (2), the light input port (3), and the light output port (4) together constitute a reflective optical system; wherein a collimated light beam enters through the light input port (3), reflects between the first reflector (1) and the second reflector (2), and exits through the light output port (4);

the second reflector (2) includes a concave surface and an outer annular surface, with the concave surface set within the outer annular surface; the light input port (3) and the light output port (4) are both located on the outer annular surface of the second reflector (2);

the first reflector (1) is a concave mirror; and wherein a light path of the collimated light beam reflecting between the first reflector (1) and the second reflector (2) is as follows: the collimated light beam enters through the light input port (3) and first reaches the first reflector (1), reflects off the first reflector (1) to the concave surface of the second reflector (2), then reflects off the second reflector (2) back to the first reflector (1), and finally from the first reflector (1) to the outer annular surface of the second reflector (2); wherein a pattern of reflection of the light path of the collimated light beam repeats.

2. The long-path gas absorption cell optical system according to claim 1, characterized in that a central angle γ corresponding to the space between the light input port (3) and the light output port (4) is related to a radius of curvature R1 of the first reflector (1), a radius of curvature R3 of the concave surface of the second reflector (2), or a spacing distance d between the first reflector (1) and the second reflector (2).

3. The long-path gas absorption cell optical system according to claim 2, characterized in that the incident collimated light beam forms an axial angle α with an axis of the second reflector (2), and a radial angle β of the collimated light beam projected on the second reflector (2), with both the axial angle α and the radial angle β being related to the radius of curvature R1 of the first reflector (1), the radius of curvature R3 of the concave surface of the second reflector (2), or the spacing distance d between the first reflector (1) and the second reflector (2).

4. The long-path gas absorption cell optical system according to claim 3, characterized in that a number of reflected light spots formed on the first reflector (1) is equal to the number of reflected light spots formed on the second reflector (2).

5. The long-path gas absorption cell optical system according to claim 4, characterized in that the radius of curvature R3 of the concave surface of the second reflector (2) is equal to the radius of curvature R1 of the first reflector (1), and the outer annular surface of the second reflector (2) is a flat structure.

6. The long-path gas absorption cell optical system according to claim 4, characterized in that the radius of curvature R3 of the concave surface of the second reflector (2) is equal to the radius of curvature R1 of the first reflector (1), and a radius of curvature R2 of the outer annular surface of the second reflector (2) is approximately 2.1*R1 to 2.2*R1; the light input port (3) and the light output port (4) are both set between a diameter D4, where the outer annular surface and the concave surface meet, and an outer diameter D3 of the outer annular surface.

7. The long-path gas absorption cell optical system according to claim 3, characterized in that the radius of curvature R3 of the concave surface of the second reflector (2) is equal to the radius of curvature R1 of the first reflector (1), and the outer annular surface of the second reflector (2) is a flat structure.

8. The long-path gas absorption cell optical system according to claim 3, characterized in that the radius of curvature R3 of the concave surface of the second reflector (2) is equal to the radius of curvature R1 of the first reflector (1), and a radius of curvature R2 of the outer annular surface of the second reflector (2) is approximately 2.1*R1 to 2.2*R1; the light input port (3) and the light output port (4) are both set between a diameter D4, where the outer annular surface and the concave surface meet, and an outer diameter D3 of the outer annular surface.

9. The long-path gas absorption cell optical system according to claim 2, characterized in that the radius of curvature R3 of the concave surface of the second reflector (2) is equal to the radius of curvature R1 of the first reflector (1), and the outer annular surface of the second reflector (2) is a flat structure.

10. The long-path gas absorption cell optical system according to claim 9, characterized in forming a ring of reflected light spots on the first reflector (1), and forming a ring of reflected light spots on both the concave surface and the outer annular surface of the second reflector (2).

11. The long-path gas absorption cell optical system according to claim 2, characterized in that the radius of curvature R3 of the concave surface of the second reflector (2) is equal to the radius of curvature R1 of the first reflector (1), and a radius of curvature R2 of the outer annular surface of the second reflector (2) is approximately 2.1*R1 to 2.2*R1; the light input port (3) and the light output port (4) are both set between a diameter D4, where the outer annular surface and the concave surface meet, and an outer diameter D3 of the outer annular surface.

12. The long-path gas absorption cell optical system according to claim 11, characterized in that the reflection of light path of the collimated light beam ultimately forming two rings of reflected light spots on the first reflector (1), two rings of light spots on the concave surface of the second reflector (2), and one ring of reflected light spots on the outer annular surface of the second reflector (2) for a total of three rings of light spots on the second reflector (2).

13. The long-path gas absorption cell optical system according to claim 12, characterized in that the collimated light beam enters through the light input port (3) and first reaches the first reflector (1) at a reflected light spot ring I, reflects off the first reflector (1) to a third ring of reflected light spots on the second reflector (2), then reflects off the second reflector (2) back to the reflected light spot ring I on the first reflector (1), after reflecting off the first reflector (1) it returns to a first ring of reflected light spots on the second reflector (2), after reflecting off the second reflector (2) it reaches a reflected light spot ring II on the first reflector (1), then after reflecting off the first reflector (1) it returns to a second ring of reflected light spots on the second reflector (2), and after reflecting off the second reflector (2) it returns to the reflected light spot ring I on the first reflector (1), then after reflecting off the first reflector (1) it returns to the second ring of reflected light spots on the second reflector (2).

14. The long-path gas absorption cell optical system according to claim 13, characterized in that the reflected light spot ring I is located between an annular diameter D2 and an outer diameter D1 on the reflective surface of the first reflector (1), and the reflected light spot ring II is located within the annular diameter D2;

the first ring of reflected light spots is located within an annular region between the outer diameter D3 and diameter D4 of the outer annular surface, the second ring of reflected light spots is located within an annular region between diameter D4 and an annular diameter D5 on the concave reflective surface, and the third ring of reflected light spots is within the range of the annular diameter D5; the light input port (3) and the light output port (4) are both set at the center of the light spots of the first ring of reflected light spots.

* * * * *